US009776478B2

(12) United States Patent
Dryselius et al.

(10) Patent No.: US 9,776,478 B2
(45) Date of Patent: Oct. 3, 2017

(54) DIGITAL SUNSHADE FOR AUTOMOTIVE GLASS

(71) Applicant: VOLVO CAR CORPORATION, Gothenburg (SE)

(72) Inventors: Joakim Dryselius, Vastra Frolunda (SE); Daniel Olsson, Alingsas (SE)

(73) Assignee: Volvo Car Corporation, Gothenburg (SE)

( * ) Notice: Subject to any disclaimer, the term of this patent is extended or adjusted under 35 U.S.C. 154(b) by 11 days.

(21) Appl. No.: 14/491,335

(22) Filed: Sep. 19, 2014

(65) Prior Publication Data

US 2015/0097389 A1 Apr. 9, 2015

(30) Foreign Application Priority Data

Oct. 3, 2013 (EP) .................................... 13187241

(51) Int. Cl.

*B60J 3/04* (2006.01)
*G02F 1/133* (2006.01)
*G02F 1/1333* (2006.01)

(52) U.S. Cl.

CPC ............ *B60J 3/04* (2013.01); *G02F 1/13306* (2013.01); *G02F 1/13338* (2013.01)

(58) Field of Classification Search

CPC .. B60J 3/007; B60J 3/0286; B60J 3/04; B60R 16/037; B60R 16/0373; G02F 1/13306; G02F 1/13338

See application file for complete search history.

(56) References Cited

U.S. PATENT DOCUMENTS

| | | | | |
|---|---|---|---|---|
| 4,688,895 | A * | 8/1987 | Jacob | B60J 3/04 349/116 |
| 4,892,394 | A | 1/1990 | Bidabad | |
| 5,114,218 | A * | 5/1992 | Black | G02C 7/101 351/158 |
| 5,271,580 | A * | 12/1993 | Speelman | B60J 3/04 244/121 |
| 6,116,639 | A * | 9/2000 | Breed | B60R 11/0241 180/272 |
| 6,580,472 | B1 * | 6/2003 | Willingham | B60J 3/04 349/16 |
| 9,321,329 | B2 * | 4/2016 | Beckman | G02B 27/01 |
| 9,395,857 | B2 * | 7/2016 | Wu | G06F 3/044 |
| 9,409,464 | B2 * | 8/2016 | Tomkins | B60J 3/04 |
| 2003/0227663 | A1 | 12/2003 | Agrawal et al. | |
| 2006/0045989 | A1 * | 3/2006 | Minami | B32B 7/12 428/1.1 |
| 2006/0175859 | A1 * | 8/2006 | Isaac | B60J 3/04 296/97.4 |
| 2009/0015740 | A1 * | 1/2009 | Sagitov | B60J 3/04 349/16 |
| 2009/0058126 | A1 * | 3/2009 | Broude | B60J 3/04 296/97.2 |
| 2009/0109036 | A1 | 4/2009 | Schalla et al. | |
| 2010/0065721 | A1 | 3/2010 | Broude et al. | |
| 2011/0115990 | A1 * | 5/2011 | Bhaktiar | B60R 11/0235 348/794 |
| 2011/0227835 | A1 * | 9/2011 | Lin | G02F 1/13338 345/173 |
| 2011/0303828 | A1 * | 12/2011 | Mikat | B60J 3/04 250/214 R |
| 2013/0204457 | A1 | 8/2013 | King et al. | |
| 2014/0055831 | A1 * | 2/2014 | Johnson | B60J 3/04 359/238 |
| 2014/0229174 | A1 * | 8/2014 | Graumann | G10L 15/22 704/231 |
| 2015/0077361 | A1 * | 3/2015 | Seo | B60R 1/088 345/173 |
| 2016/0318379 | A1 * | 11/2016 | Okuda | G02F 1/13338 |

FOREIGN PATENT DOCUMENTS

| | | | | |
|---|---|---|---|---|
| CA | 2487691 | A1 * | 5/2005 | B60J 3/02 |
| DE | 19630813 | | 3/1997 | |
| DE | 10057795 | | 5/2002 | |
| DE | 20320919 | | 6/2005 | |
| DE | 102004050987 | | 12/2005 | |
| DE | 102014201098 | A1 * | 7/2015 | B60J 3/04 |
| FR | 755546 | A * | 11/1933 | B60J 3/007 |
| FR | 780548 | A * | 4/1935 | B60J 3/007 |
| FR | 2864473 | A1 * | 7/2005 | B60J 3/04 |
| FR | 2899852 | A3 * | 10/2007 | B60J 3/007 |
| FR | 2970679 | | 7/2012 | |
| FR | 3002194 | A1 * | 8/2014 | B60Q 1/2665 |
| FR | WO 2015118242 | A1 * | 8/2015 | B32B 17/10 |
| GB | 1548874 | A * | 7/1979 | B60J 3/007 |
| NL | 9102116 | A * | 7/1993 | B60J 3/04 |
| WO | 9204522 | | 3/1992 | |
| WO | WO 9624881 | A1 * | 8/1996 | B60J 3/04 |
| WO | WO 2007116174 | A1 * | 10/2007 | B60J 3/04 |
| WO | WO 2014118672 | A2 * | 8/2014 | B60J 3/04 |

OTHER PUBLICATIONS

European Search Report for EP 13187241, Completed by the European Patent Office on Jun. 25, 2014, 5 Pages.

Partial European Search Report for EP 13187241.8, Completed by the European Patent Office, Dated Mar. 11, 2014, 8 Pages.

Extended European Search Report for EP 13187241.8, Completed by the European Patent Office, Dated Jul. 2, 2014, 5 Pages.

* cited by examiner

*Primary Examiner* — Glenn Dayoan
*Assistant Examiner* — Paul Chenevert
(74) *Attorney, Agent, or Firm* — Brooks Kushman P.C.

(57) ABSTRACT

A sunscreen system includes a control unit and a sunscreen having a first nonplanar glass layer and a nonplanar display layer having a first side and an opposite second side. The first side is adhered to the glass layer. The display layer includes multiple display subareas covering the overall surface of the display layer. Each separate display subarea may be controlled by the control unit to change the subarea's transmittance. A nonplanar design allows integration in a vehicle body and multiple display subareas allows partial area-wise blocking of light. All electronic components can be provided in or adjacent to the sunscreen or be arranged at another location in the vehicle, leading to a flexible design which allows a larger area panoramic roof due to reduction of mechanical components in the roof structure.

20 Claims, 5 Drawing Sheets

DIGITAL SUNSHADE FOR AUTOMOTIVE GLASS

CROSS-REFERENCE TO RELATED APPLICATIONS

This application claims foreign priority benefits under 35 U.S.C. §119(a)-(d) to European patent application number EP 13187241.8, filed Oct. 3, 2013, which is incorporated by reference in its entirety.

TECHNICAL FIELD

The present disclosure relates to sun shading for vehicles and to vehicles with window-integrated sunshades. The disclosure specifically relates to sunshades with controllable transmittance.

BACKGROUND

Current solutions for sun protection on vehicle glass consist mainly of protective covers such as sun visors, side/rear window sunshades, luggage covers, etc. These covers are generally located on a relatively fixed position in the interior of the vehicle and are manually operated, for example by folding or pull-release. Similarly, some current solutions for sun protection on a sunroof system consist of a mechanical roller blind system which is often motorized. These roller blind systems typically have several components, for example an electric motor, a frame system, a drive system and a textile roller curtain and these components require a large packing volume, i.e. they occupy a significant portion of the interior of the roof. Furthermore they induce weight-, costs- and quality issues. There is consequently an incentive to improve the sun protection in the vehicle and additionally it would be desirable for customers and consequently manufacturers to provide larger panoramic roofs as an option.

There are in both the vehicle industry and in infrastructure examples of sunshades comprised in the glass in the form of particles that change the transparency of the glass at the application of an electric current. There is also transparent electrochromic coated glass available that change the transparency of the glass by applying a voltage to a conducting layer of the glass to initiate a solid state reaction over the coated layer of the glass. Despite that there are electrical sunscreens already available, these solutions are sometimes complex in the construction, offer only basic sunshading function and may be slow to react. Also, they tend to be complicated to operate. It would therefore be desirable to additionally present a more adaptable sunscreen which is intuitive to control.

SUMMARY

It is an object of the present disclosure to address the shortcomings of the prior art, and to provide an improved sunscreen system for vehicles which allows for a larger area of the vehicle roof for the panoramic roof and may reduce the weight while being more cost effective to manufacture. Another object is to provide a sunscreen system which may be applied to other windows in a vehicle and which is intuitive to operate.

According to a first aspect of the disclosure, these and other objects are achieved with a sunscreen system comprising a control unit and a sunscreen having a first nonplanar glass layer and a nonplanar display layer having a first side and an opposite second side. The first side is adhered to the glass layer, wherein the display layer comprises a plurality of display subareas covering the overall surface of said display layer. Each separate display subarea may be controlled by the control unit to change the subarea's transmittance.

Thus, the disclosure is based on the insight that a non-planar design allows integration in a vehicle body and a plurality of display subareas allows partial area-wise blocking of the sun. The combination of these features has not been previously disclosed, and provides several advantages compared to prior art sunscreen systems.

All control elements and electronic circuitry can be provided in or adjacent to the sunscreen or be arranged at another location in the vehicle, leading to a flexible design which for example allows a larger area panoramic roof due to removal of motor-, roller-, frame- and drive components in the roof structure. Further, the control elements may be shared between sunscreens replacing additional vehicle windows panes.

According to this design the display layer is adhered to a first glass layer of the vehicle window which is to be fitted with a sunscreen. The display layer may advantageously be equal to the glass layer in its extension, but a partial cover of the glass layer may also be considered such as for example in an application over the upper edge area of the front window. The display layer is preferably adhered to the side of the first glass layer which is to be arranged to the interior of the vehicle.

According to at least one exemplary embodiment of the disclosure the sunscreen further comprises a second nonplanar glass layer, being adhered to the second side of the display layer. By this design the display layer is sandwiched between two layers of glass, the display layer may work as a common interlayer of a laminated safetyglass. Such an interlayer adheres to multiple layers of glass, preventing the glass screen from breaking into small sharp shards.

According to at least one further exemplary embodiment of the disclosure the first glass layer has a first side, which is the side adhered to the first side of the display layer, and an opposite second side. The sunscreen further comprises a second glass layer, being adhered to the second side of said first glass layer. The effect of this is that the display layer may advantageously be adhered to the side of a laminated glass pane which is facing the interior of the vehicle. This may allow for the application on a laminated glass window which in itself may be used in vehicles that are not equipped with the sunscreen system, thereby allowing the use of the same or similar parts in a modular manner.

Each display subarea may advantageously be controlled simultaneously with other display subareas or controlled individually. This provides the effect that the transmittance of a partial area of the sunscreen may be changed to block the sunlight for only one passenger or simultaneously block the sunlight hitting multiple passengers, both while leaving the rest of the sunscreen transparent. The display subareas may preferably comprise at least one display pixel, suitably a plurality of display pixels. As with common display screens the size and/or the density of the pixels will affect the ability of a screen to display images of higher resolution. In the case of sunscreen systems according to the disclosure the effect of a higher resolution is that the sunscreen system will allow a more precise adjustment of where over the surface of the sunscreen the transmittance may be adjusted. Furthermore, this may also allow a finer adjustment of the level of transmittance.

According to at least one exemplary embodiment the nonplanar display layer is a nonplanar and at least semi-transparent LCD (Liquid Crystal Display). This has the effect that the sunscreen may be controlled as an ordinary display, for example having a matrix of display pixels over the surface wherein the transparency of each pixel is controllable by a control unit. In difference to an LCD used in for example a television, there is no light providing luminance behind the screen as this comes from the ambient light. Apart from being able to change transmittance of areas as small as a pixel, a display such as an LCD may have the advantage of changing the transmittance quicker, as compared to sunscreens having electrochromic layers, coats or embedded particles.

Furthermore, the sunscreen system advantageously comprises a user control interface, arranged to provide input to the control unit, for controlling the transmittance of the plurality of display subareas. The user control interface may be operated to change the transmittance of the entire display layer or the transmittance of at least one subarea. Advantageously the user control interface is arranged to detect inputs such as a location, a movement or a duration. The user control interface may interpret and correlate inputs to subareas. For example a first position input corresponding to at least one subarea, a direction based on a movement subsequent to the first position input corresponding to further subareas or a duration corresponding to a change intended to occur for said duration. The user control interface is not limited to detecting the aforementioned inputs.

According to at least one exemplary embodiment of the disclosure the user control interface comprises a touch sensitive transparent layer, being nonplanar and forming an innermost layer of the sunscreen. By this design the sunscreen has a touch sensitive layer on the side which is facing the interior of the vehicle, a side which is advantageously both protected from the environment and closer to the operator of the user control interface. Preferably, the touch sensitive layer comprises surface areas, arranged so that each display subarea has a corresponding touch sensitive surface area, so that the transmittance of each of said subareas may be controlled by the associated corresponding surface area on the touch sensitive layer. This has the advantage that the transmittance of a display subarea may intuitively be operated by touching the sunscreen essentially on the subarea which is to be controlled, e.g. on the surface area in proximity to the subarea. However, this does not exclude the possibility to control subareas which are not touched. It may be advantageous to additionally allow operation of the transmittance of at least one subarea which is not in close proximity to the surface of the sunscreen which has been touched. For example this presents the possibility to provide a general input to operate the overall sunscreen area or to provide an input to control a subarea which is out of reach for the operator.

According to another embodiment of the disclosure the user control interface comprises at least one sensor arranged to detect contactless interaction with said sunscreen. Such a sensor may detect eye gaze direction, voice commands or detect the extension of an extremity, such as a limb of the operator. This may enable the possibility of operating subareas which are out of reach for the operator. A back seat passenger may for example be able to operate the sunscreen to block sun light which is hitting the passenger via the front part of the sunscreen, additionally this may enable shorter passengers to operate the sunscreen. An added effect is that the sunscreen may be less subjected to smudges as compared to a sunscreen with touch sensitive interface.

Advantageously, the control unit is arranged to detect if a first user input represents an encircling edge, defining a first figure, and further arranged to associate at least one of the display subareas with the first figure, based on a position and an extension of the encircling edge, so that the transmittance of each display subarea associated to the first figure may be controlled simultaneously. This allows an operator to intuitively and efficiently define an area for changing the transmittance. A first user input representing an encircling edge may be the moving of a finger along a path of the touch sensitive layer, wherein the path defines an encircling edge of a figure. The first user input may also be the contactless detection of movement of the operator's limb defining an encircling edge, for example the operator may draw a figure in the air directed at the sunscreen, wherein the user control interface may be arranged to translate the direction of the limb to the surface of the sunscreen. Preferably, the user control interface is adapted to determine the enclosing edge of a figure even if a starting point and an ending point of the path do not meet or if they overlap, in which case the figure may be extrapolated. For example, there may be a lacking distance in the range of a few centimeters or there may be an overlapping distance of the path defined. The figure may for example be a circle or a polygon. This has the effect that a user may define an arbitrary area wherein the transmittance is either automatically changed to block or to allow the ambient light to pass, or is controlled with subsequent inputs. It may additionally be possible to define multiple figures for simultaneous control.

Furthermore the control unit may be arranged to detect if a first user input represents a moving motion, defining at least a first direction and further arranged to associate at least one of the display subareas with the first direction, based on a position and an extension of the first direction, so that the transmittance of each display subarea associated to said first direction may be controlled simultaneously. The moving motion may for example be understood as a limb of the user starting at a point representing a first position on the surface of the sunscreen and defining a path to a second point representing a second position on the surface of the sunscreen. Additionally a second limb may also be involved, similarly defining a second path with a third point and a fourth point. Based on at least one moving motion the control unit may determine a selection of subareas to be controlled or a characteristic to be controlled for a selection of subareas, wherein a characteristic may be transmittance for example.

For reference in the context of the disclosure it may be stated that glass windows for buildings are generally planar, meaning that the main surface of such a window extends in one plane and is not curved. However, glass layers in vehicles are often nonplanar, for aerodynamic or aesthetic reasons. They may for example be single-curved relative to a first axis, meaning that a cross section of the glass layer will define an arc or a curve described with at least one radius. This may for example be the case with side windows, for which a sunscreen system according to the disclosure may be well suited.

According to at least one exemplary embodiment of the disclosure the nonplanar layers are double-curved, meaning that the layers will define an arc or a curve described with at least one radius, in two cross sections along a first and a second nonparallel axes. This design makes the sunscreen suitable for double-curved panoramic roofs, rear windows and windscreens.

In at least one exemplary embodiment of the sunscreen system the display layer, the control unit and the user control interface are electrically connected. When the hand of the operator approaches and/or touches the sunscreen it is sensed by the user control interface and a signal is generated and sent to the control unit. The control unit decodes the signal from the user control interface. Depending on the state of the display layer, the general state of the environment and/or previous signals the control unit decides whether the display should change its graphical state. This decision may comprise changing the transmittance of at least one subarea. In such a case a signal is sent to the display layer to change the transmittance accordingly. The affected subareas change their transmittance as a result of said signal.

According to a second aspect of the disclosure a vehicle is provided, comprising a sunscreen system according to the first aspect, wherein the sunscreen is at least one of windscreen, sunroof, panoramic roof, side window or rear window.

Furthermore according to at least one exemplary embodiment the user control interface is arranged to determine a seating position of a user, and wherein the control unit is further arranged to associate a predetermined subset of said display subareas based on the seating position, wherein the transmittance of the subset may be controlled by the user. The user control interface may for example be arranged to detect whether the operating user's limb extends from a particular seat. Other system-external sources of information may also be employed to detect the seating position of the user, such as for example pressure sensors in seats, cameras arranged in the interior of the vehicle, IR-sensors or sonic sensors. This may provide the possibility to, for example, allow the driver control of the entire sunscreen system, while a passenger may be allowed to only control the sunscreen in the passenger's proximity or a limited subarea through which ambient light is hitting the passenger. The advantage of this may be a higher traffic safety level, as the driver may get distracted or even impaired vision if the sunscreen system by operation of a passenger either blocks the driver's view, makes a shaded subarea transparent or flickers a lot in the peripheral view of the driver. Preferably, this predetermined subset may be set by the vehicle driver, similar to a child lock, and/or determined by factors such as incident light angles, the passenger's and driver's respective fields of view, etc.

Further effects and features of this second aspect of the present disclosure are largely analogous to those described above in connection with the first aspect of the disclosure.

BRIEF DESCRIPTION OF THE DRAWINGS

These and other aspects of the present disclosure will now be described in more detail, with reference to the appended drawings showing exemplary embodiments of the disclosure, wherein.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the following description, the present disclosure is mainly described with reference to a vehicle equipped with a sunscreen system, whereby references to interior, exterior, innermost, outermost, forward, rear and the respective sides are made with respect to a car with a passenger compartment as the interior. In the following description the sunscreen and the control unit are located in the roof of a vehicle, however other locations are conceivable.

Figure 1:
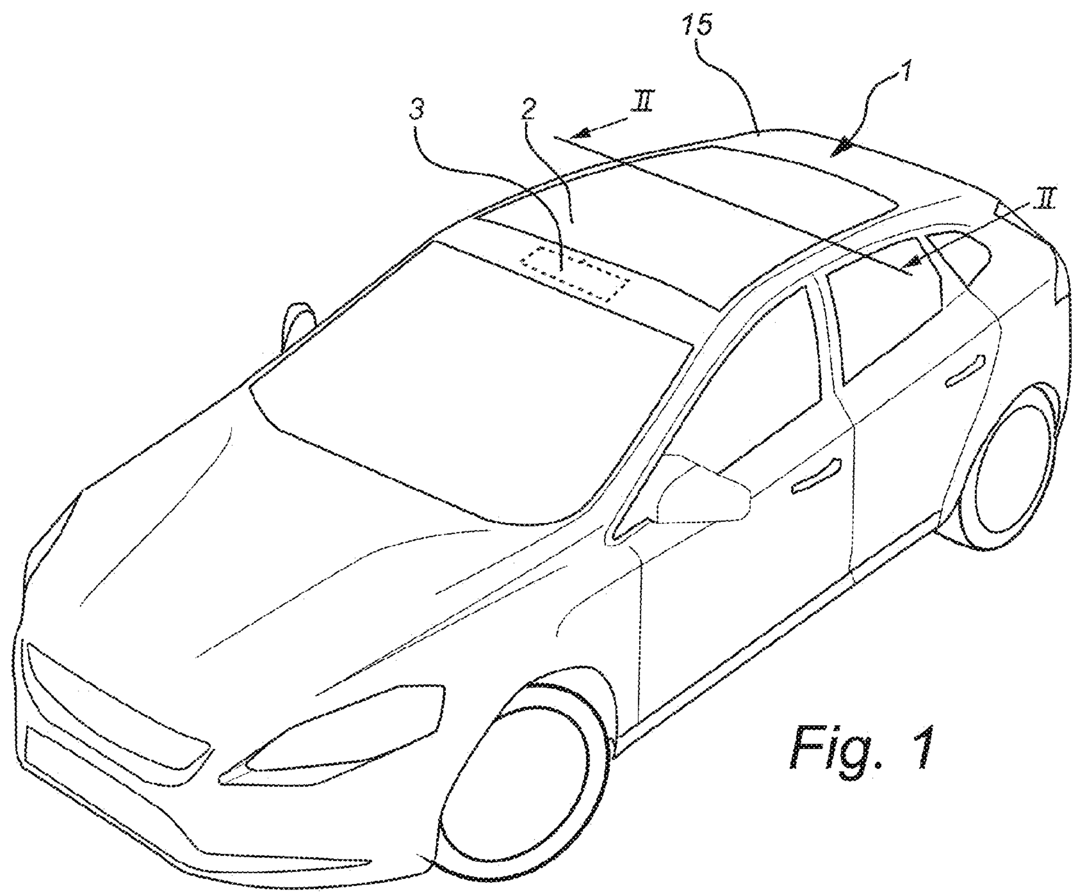
FIG. 1 shows a perspective view of a vehicle equipped with a sunscreen system of an exemplary embodiment of the disclosure.
Figure 2:
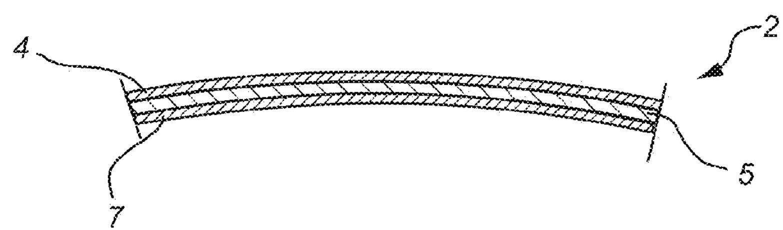
FIG. 2 is a cross section of a sunscreen of an exemplary embodiment of the disclosure.

FIG. 1 shows a perspective view of a vehicle equipped with a sunscreen system 1 of an exemplary embodiment of the disclosure. In FIG. 1 a roof 15 of a passenger car can be seen in perspective. The roof 15 is provided with a sunscreen system comprising a sunroof or panoramic roof in the form of a sunscreen 2 and a control unit 3, which is not exposed and therefore illustrated with dotted lines. It should be noted that the control unit 3 may comprise a processor or the like, and may include a memory and stored computer executable instructions for performing any of the functions, operations or steps described herein. FIG. 2 is a detailed cross-section along line II-II of the sunscreen in FIG. 1.

FIG. 2 illustrates how the sunscreen 2 comprises a glass layer 4 as the top layer. The top layer is also the exterior layer as seen from the vehicle, i.e. the layer exposed to the environment. The glass layer 4 may preferably be adapted for vehicle applications and regulations, and there should be no additional need to adapt the glass for the sunscreen 2. In this example embodiment a display layer 5 is adhered directly to the glass layer 4 across the overall innermost side of the surface of the glass layer 4. Interior to the display layer 5 the sunscreen 2 according to this example embodiment is provided with a touch sensitive layer 7 adhered to the surface of the display layer 5. The touch sensitive layer 7 may for example be capacitive or resistive and comprise the relevant sensors and protective layers as in touch sensitive layers in common touch sensitive displays. As is illustrated in the cross section shown in FIG. 2, the sunscreen 2 is curved. Preferably, the sunscreen 2, and consequently all the comprising layers, is curved so that it may match the contour of the vehicle roof. Likewise, if a cross section were taken from the front to the rear there would be a similar curvature of the sunscreen, for integrating the sunscreen with the profile contour of the vehicle roof from the side. There is commonly a blackout edge encircling the exterior surface of vehicle glass, for example for covering interior seals and components from exterior view, in which case the display layer 5 and touch sensitive layer 7 may be reduced in area to cover only the region of the glass layer 4 not covered by the blackout edge. Relative thickness as shown in the figures is only illustrative. Similarly, the curvature shown is also for illustrational purposes.

Figure 3A:
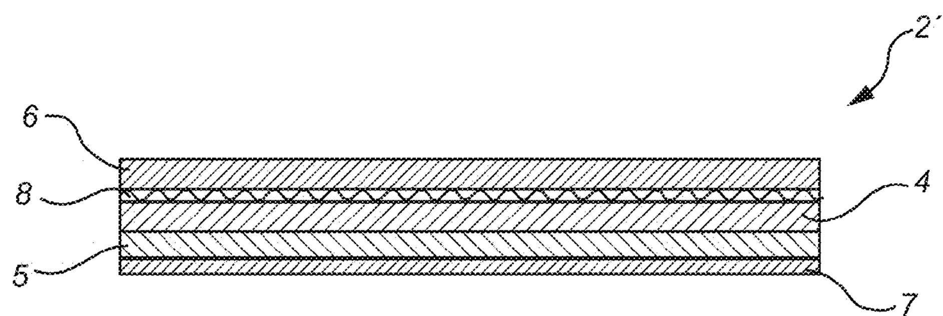
FIG. 3*a* shows a closer cross section of a sunscreen of one exemplary embodiment of the disclosure.

FIG. 3*a* shows a closer cross section of a sunscreen 2' of one exemplary embodiment of the disclosure. In this example the sunscreen 2' comprises a second glass layer 6 adhered to the outermost surface of the first glass layer 4 with an adhesive film 8 sandwiched between the first- 4 and the second glass layer 6. The design with two laminated glass layers and an adhesive film is common for safety glass in vehicles, as the adhesive film at least mostly prevents the glass from shattering into small sharp shards. Instead the shards of the two glass layers are kept together if the glass breaks. The display layer 5 is adhered to the interior surface of the first glass layer 4. Furthermore, there is a touch sensitive layer 7 adhered to the interior surface of the display layer 5.

Figure 3B:
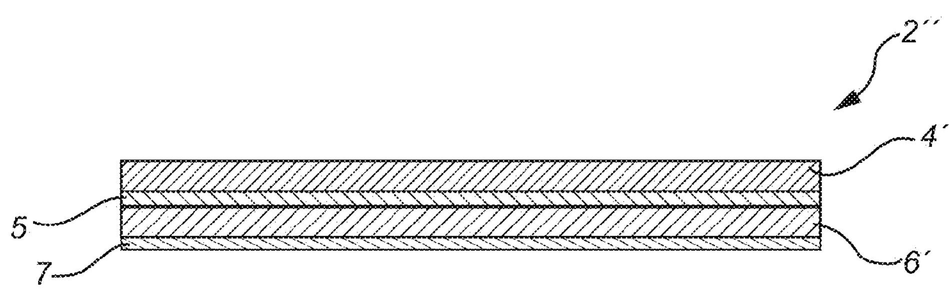
FIG. 3*b* shows a closer cross section of a sunscreen of another exemplary embodiment of the disclosure.

FIG. 3*b* shows a closer cross section of a sunscreen 2" of another exemplary embodiment of the disclosure. In this example the display layer 5 is adhered to the interior surface of the first glass layer 4. Furthermore, the sunscreen 2" comprises a second glass layer 6' adhered to the interior surface of the display layer 5, sandwiching the display layer 5 between the first- 4 and the second glass layer 6. In this design the display layer may act as the adhesive layer 8 illustrated in FIG. 3*a* in terms of being adhesive to both the first- and second glass layer and thus preventing or at least mitigating the formation of sharp shards that are free and may harm passengers. In at least this one example embodiment a touch sensitive layer 7 is adhered to the interior surface of the second glass layer 6'. Although FIGS. 2, 3*a*-3*b* show a touch sensitive layer 7 for receiving input from a user, it should be understood that the layer 7 may be omitted if contactless input is provided for, as described in this application.

Figure 4A:
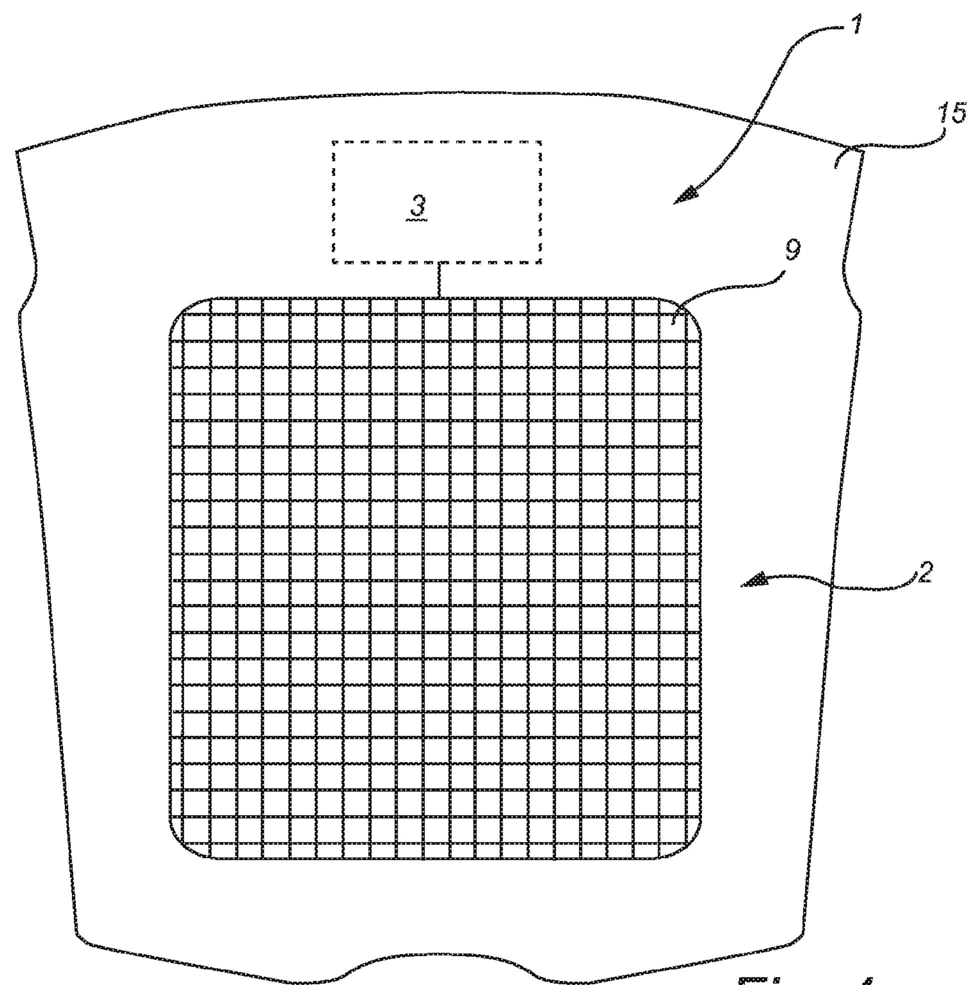
FIGS. 4*a-b* schematically show an exemplary embodiment of the present disclosure and a close up of the exemplary embodiment.

FIG. 4*a* schematically shows an exemplary embodiment of the present disclosure. FIG. 4*a* shows a roof 15 of a vehicle (not shown), comprising a sunscreen system 1 according to at least one exemplary embodiment of the disclosure. For illustrative purposes the sunscreen 2 is provided with a grid system showing one example of a plurality of subsurfaces 9. On a sunscreen system produced for customers according to the exemplary embodiment the grid system is preferably not seen. The control unit 3 is advantageously arranged to control the transparency of each subarea 9 simultaneously with other display subareas or to control one display subarea 9 individually. The transmittance of a subarea 9 is preferably gradually controllable to a steeples level from essentially transparent to completely blocking incident ambient light. However, the transmittance may also be digital, in terms of having only one state which transmits ambient light and one state which blocks ambient light.

Figure 4B:
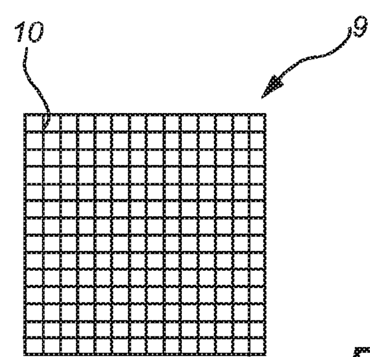

In FIG. 4*b* a detailed close up on a subarea 9 is shown to illustrate that a subarea may comprise a plurality of display pixels 10. The display pixels 10 may for example work to provide the level of transmittance, wherein the more pixels are blocking ambient light the lower the level of transmittance of ambient light is for the subarea. According to at least one example embodiment each display pixel may work as a filter for either a transmitting energy level and/or a wavelength of light, wherein the sunscreen system is preferably arranged with a plurality of pixels for each level of transmittance and/or wavelength, so that different transmittance levels may be achieved by activating a set of pixels correlating to the desired transmittance energy level and/or wavelength of transmitted ambient light. Alternatively, the pixels 10 in FIG. 4*b* may illustrate that the size of a subarea may be as small as a pixel.

It should be noted that the number, density and form of the subareas 9 in FIG. 4*a* is only illustrative to give one example of the resolution. Similarly, the number, density and form of the pixels 10 in FIG. 4*b* is also only illustrative.

Moving on to a user interface of a sunscreen system according to at least one example embodiment of the disclosure, FIGS. 5*a*-*d* schematically show exemplary user inputs to control various features of the present disclosure. The user may preferably operate the sunscreen system 1 by providing an input directly on the surface of the sunscreen 2 or alternatively in a contactless manner in the air, in which case a user control interface (not shown) is arranged to determine points on the surface which correspond to the user input performed in the air. For example, this may be achieved by detecting the position and movement of at least one of the user's limbs and subsequently translating the position and the movement to the plane of the surface of the sunscreen.

Figure 5A:
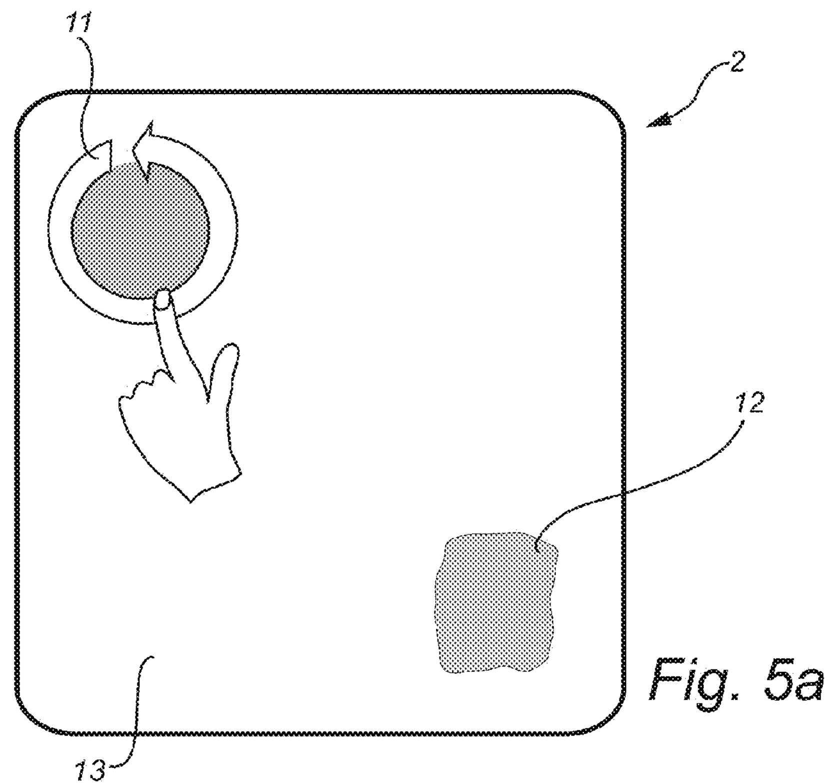
FIGS. 5*a-d* schematically show exemplary user inputs to control a selection of functions of exemplary embodiments of the present disclosure.

FIG. 5*a* illustrates an example wherein the user provides an input in the form of a circular path across the surface of the sunscreen 2. The circular path defines the encircling edge of a circle, or at least a form similar to a circle. The control unit (not shown) identifies this circular movement as an encircling edge along the surface of the sunscreen 2 and associates the subareas 11 which are encircled by the edge to the figure which is defined by the user input. Subsequently the transmittance of the associated subareas is controlled by the control unit to block ambient light. During this operation there is a plurality of subareas 12, 13, which are left unaffected by the control unit. The majority of the subareas 13 are left transparent for incident ambient light, while an association of subareas previously defined 12, is left unaffected blocking light. A FIG. 11, 12 defined by a user may have been defined as suited for a travelling direction of the vehicle (not shown) and position of for example the sun, therefore it may be desirable for the control unit to adjust the position of the FIGS. 11, 12 in relation to the relative position of the sun and/or the travelling direction of the vehicle. Alternatively, a user may manually operate a previously defined figure to virtually move the figure. The form of the figure may be defined essentially arbitrarily by the user, restricted by for example the resolution of the display subareas.

Figure 5B:
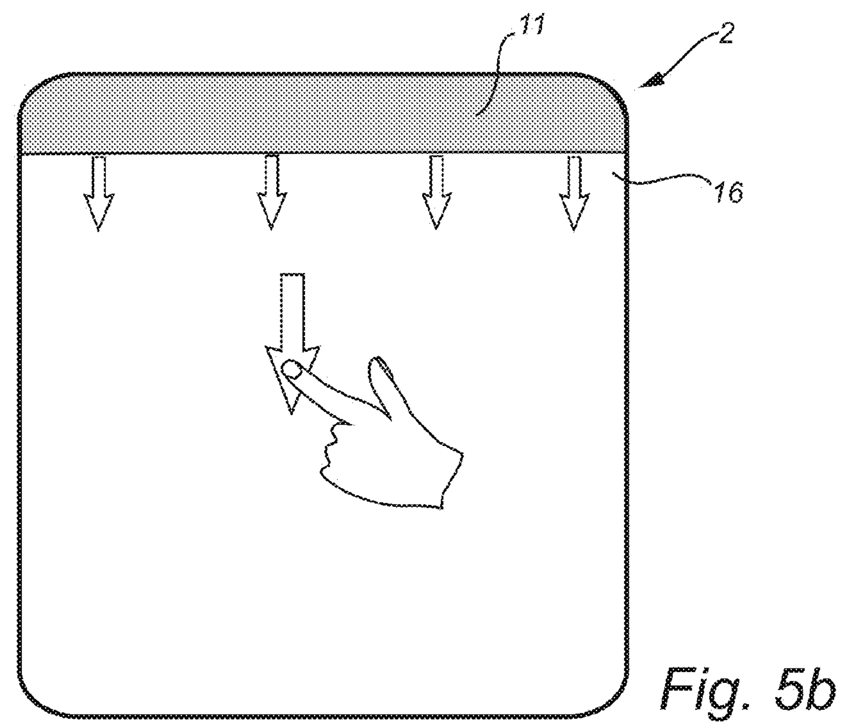

FIG. 5*b* illustrates an example wherein the user provides an input in the form of an essentially straight path in the forward (or rearward, or lateral) direction of the vehicle across the surface of the sunscreen 2. The control unit (not shown) identifies this path movement as a direction across the sunscreen 2, and preferably additionally determines the duration of the input, and associates the rearward subareas 14 (or forward, or opposite lateral) to the direction. Subsequently the transmittance of the associated subareas 14 is controlled by the control unit to block ambient light. Preferably this is performed in a manner similar to closing a mechanical rolling blind, wherein further subareas in the direction of the arrows 16 illustrated in FIG. 5*b* are continuously associated with the direction until the entire sunscreen 2 is blocking ambient light, or until the operator halts the change of transmittance. Similarly, the opposite may be performed with a sunscreen 2 which is already at least partly blocking ambient light, so that the sunscreen 2 may become transparent in a manner similar to opening a mechanical rolling blind.

Figure 5C:
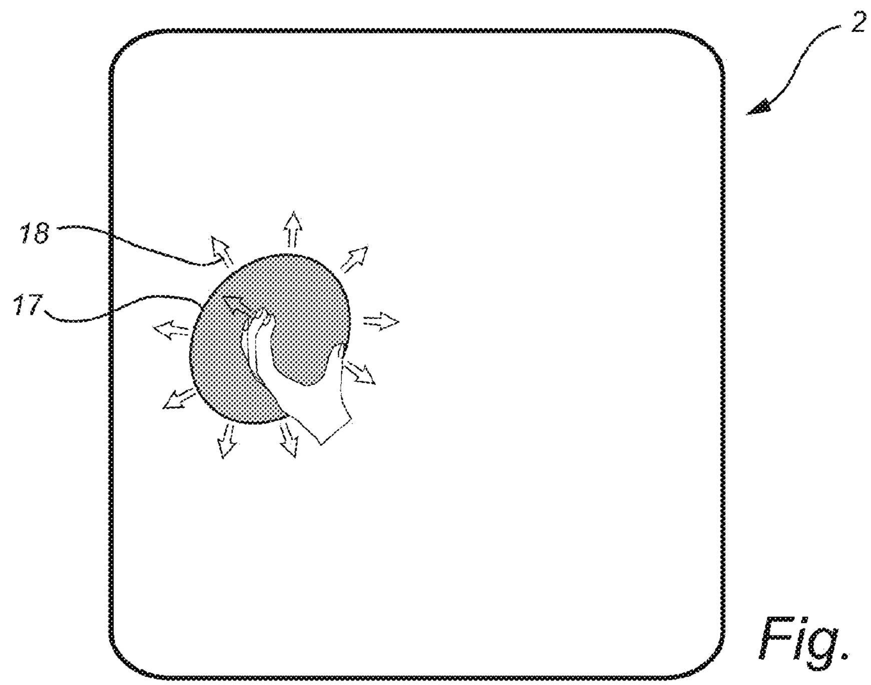

FIG. 5*c* illustrates an example wherein the user provides an input in the form of a separating movement of for example the index finger and the thumb at the surface of the sunscreen 2 comprising an associated FIG. 17, similar to a FIG. 11, 12 as described in the example for FIG. 5*a*. The control unit (not shown) identifies these path movements as separating directions across the sunscreen 2, and preferably additionally determines the duration of the input, and associates the subareas comprised in the FIG. 17 with these directions, as well as associating the subareas in external proximity to the encircling edge of the FIG. 17. Consequently the extension of the FIG. 17 is expanded in the directions of the arrows 18 illustrated in FIG. 5*c*. Similarly there may be a user operation where two paths move together, indicating the desire to decrease the extension of a figure.

Figure 5D:
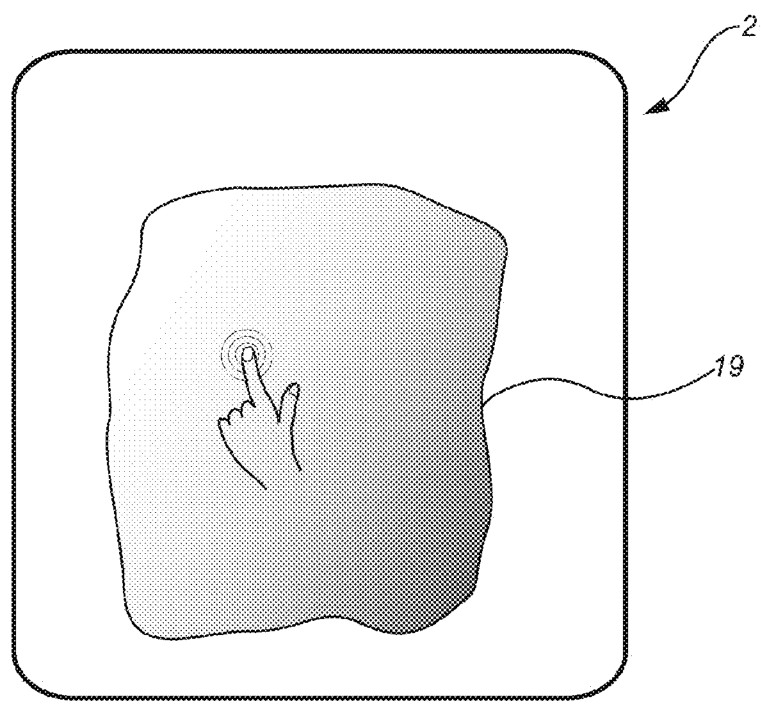

FIG. 5*d* illustrates an example wherein the user provides an input in the form of a single position at the surface of the sunscreen containing a FIG. 19, which at the beginning of the operation has a high level of transmittance as illustrated in the top left part of the illustrated figure. The control unit (not shown) identifies the position input as a position on the sunscreen, and preferably additionally determines the duration of the input. Based on the position of the input the control unit associates a FIG. 19 with the position, or the entire sunscreen 2 if no figure is present at the position. In this example the control unit gradually changes the transmittance of the FIG. 19, or the entire sunscreen 2, preferably during the duration of the input, so that the user may cease the input when a desired transmittance is achieved. The gradual change may be from a transparent state to an opaque state or the gradual change may be continuously oscillating between the two states, until the input ceases. This is illustrated with a gradual change in grayscale towards the lower right of the illustrated figure, which is to be interpreted as the transmittance changing over time rather than over surface of the FIG. 19, or sunscreen 2.

Additionally, variations to and combinations of the disclosed embodiments can be understood and effected by the skilled person in practicing the claimed disclosure, from a study of the drawings, the disclosure, and the appended claims. For example, there may be user inputs that essentially instantly change the transmittance of the entire surface to the maximum level, making the sunscreen completely transparent, or similarly to the minimum transmittance level. Such an input may be that the user issues a voice command, moves an open palm of the hand across the surface of the sunscreen, operates a button in the vehicle or operates a predetermined point on the touch sensitive/contactless user interface. Alternatively, the control unit may automatically control the entire surface based on input from a vehicle bus. Such input may be climate information from the on board climate system, key-ignition state, central locking system state, etc.

Furthermore the present disclosure is equally applicable to a side window, rear window or windscreen as well as on other vehicles than passenger cars. The system may be implemented even if the user control interface is located in for example the instrument panel or on a nomadic device such as a computer tablet connected to the vehicle. Each glass layer may be exchanged by for example a polymer screen without adversely affecting the sunscreen system according to the disclosure. Similarly the different layers of the sunscreen may be adhered together with additional adhesive layers, or in the cases where this is possible, be deposited or printed on another layer of the sunscreen. For example, there are displays and/or touch sensitive layers which may be printed, deposited or etched onto glass layers.

Furthermore, there is a large variety to touch sensitive layers, such as in capacitive, resistive or IR-based touch sensitive screens, which may all be suitable as user interfaces. The touch sensitive layer may additionally comprise layers that are for example protective, scratch resistant or anti-reflexive, as may be common also with off the shelf touch sensitive layers. Similarly a contactless user interface may comprise cameras, microphones and/or IR-sensors. Examples of such user interfaces, designed for other applications are eye tracking devices for computer control, motion detectors for game consoles and IR-sensors which detect hand and finger movements for computer control. Such user control interfaces may be arranged so that the field of view for the input covers the driver, or preferably also includes the passengers as users.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A sunscreen system for automotive use, comprising:

a control unit;

a sunscreen comprising a first nonplanar glass layer, and a nonplanar display layer having a first side and an opposite second side, the first side being adhered to the glass layer, wherein the display layer comprises a plurality of display subareas covering the overall surface of the display layer, wherein each separate display subarea is controllable by the control unit for changing the transmittance of the subarea; and a user control interface, arranged to provide input to the control unit, for controlling the transmittance of the plurality of display subareas, wherein the user control interface is arranged to detect at least one position input corresponding to at least one subarea, and to detect a user movement subsequent to the position input and identify the detected user movement as a direction input, the direction input corresponding to at least one further subarea.

2. The sunscreen system according to claim 1 wherein the sunscreen further comprises a second nonplanar glass layer being adhered to the second side of the display layer.

3. The sunscreen system according to claim 1 wherein the first glass layer has a first side being adhered to the first side of the display layer, and an opposite second side, and wherein the sunscreen further comprises a second glass layer being adhered to the second side of the first glass layer.

4. The sunscreen system according to claim 1 wherein each one of the display subareas is controllable simultaneously with one or more of the other display subareas, or is controllable individually.

5. The sunscreen system according to claim 1 wherein the display subareas comprise at least one display pixel.

6. The sunscreen system according to claim 1 wherein the nonplanar display layer is a nonplanar at least semi-transparent liquid crystal display (LCD).

7. The sunscreen system according to claim 1 wherein the control unit is arranged to detect if a first user input represents an encircling edge, defining a first figure, and further arranged to associate at least one of the display subareas with the first figure, based on a position and an extension of the encircling edge, so that the transmittance of each display subarea associated to the first figure may be controlled simultaneously.

8. The sunscreen system according to claim 1 wherein the control unit is arranged to detect if a first user input represents a moving motion defining at least a first direction and further arranged to associate at least one of the display subareas with the first direction, based on a position and an extension of the first direction, so that the transmittance of each display subarea associated to the first direction may be controlled simultaneously.

9. The sunscreen system according to claim 1 wherein the nonplanar layers are double-curved.

10. The sunscreen system according to claim 1 wherein the user control interface comprises a touch sensitive transparent layer being nonplanar and forming an innermost layer of the sunscreen.

11. The sunscreen system according to claim 10 wherein the touch sensitive layer comprises surface areas arranged so that each display subarea has a corresponding touch sensitive surface area, so that the transmittance of each of the subareas may be controlled by the associated corresponding surface area on the touch sensitive layer.

12. The sunscreen system according to claim 1 wherein the user control interface comprises at least one sensor arranged to detect contactless interaction with the sunscreen.

13. The sunscreen system according to claim 12 wherein the at least one sensor is arranged to detect a position and a movement of at least one limb of a user and subsequently translating the position and the movement to a plane on a surface of the sunscreen.

14. A vehicle comprising a sunscreen system according to claim 1 wherein the sunscreen is at least one of a windscreen, sunroof, panoramic roof, side window or rear window.

15. The vehicle according to claim 14 wherein the sunscreen system further comprises a user control interface arranged to determine a seating position of a user, and wherein the control unit is further arranged to associate a predetermined subset of the display subareas based on the seating position, wherein the transmittance of the subset may be controlled by the user.

16. A sunscreen for automotive use, comprising:

a first nonplanar glass layer;

a nonplanar display layer having a first side and an opposite second side, the first side being adhered to the glass layer, wherein the display layer comprises a plurality of display subareas, wherein each separate display subarea is controllable by a control unit for changing the transmittance of the subarea; and a user control interface, arranged to provide input to the control unit, for controlling the transmittance of the plurality of display subareas, wherein the user control interface is arranged to detect at least one position input corresponding to at least one subarea, and to detect a user movement subsequent to the position input and identify the detected user movement as a direction input, the direction input corresponding to at least one further subarea.

17. The sunscreen according to claim 16 wherein the nonplanar display layer comprises an at least semi-transparent liquid crystal display (LCD).

18. The sunscreen according to claim 16 wherein the user control interface comprises a touch sensitive transparent layer forming an innermost layer of the sunscreen.

19. The sunscreen according to claim 16 wherein the user control interface comprises at least one sensor arranged to detect contactless interaction with the sunscreen.

20. The sunscreen according to claim 19 wherein the at least one sensor is arranged to detect a position and a movement of at least one limb of a user and subsequently translating the position and the movement to a plane on a surface of the sunscreen.

* * * * *